United States Patent [19]

Ostermaier

[11] 4,399,594
[45] Aug. 23, 1983

[54] STRAP LOCK DEVICE

[75] Inventor: Albert E. Ostermaier, Sherman Oaks, Calif.

[73] Assignee: Flomar Enterprises, Burbank, Calif.

[21] Appl. No.: 289,337

[22] Filed: Aug. 3, 1981

[51] Int. Cl.³ .............................................. A44B 19/00
[52] U.S. Cl. .................................... 24/201 A; 24/194; 24/226
[58] Field of Search ................. 24/165, 166, 168, 169, 24/182, 183, 184, 185, 230 BC, 230 TC, 230 AK, 230 AL, 230.5 R, 201 A, 201 R, 301, 302, 72.5, 71, DIG. 9, 310, 323, DIG. 13, DIG. 28, 250; 267/53, 54 A, 56; 403/315, 316, 317, 319

[56] References Cited

U.S. PATENT DOCUMENTS

| 726,768 | 8/1902 | Jenkins | 24/250 R |
|---|---|---|---|
| 1,037,045 | 8/1912 | Patton | 24/230 BC |
| 1,752,544 | 4/1930 | Sparrow | 403/316 |
| 3,178,987 | 4/1965 | Reese et al. | 403/316 |
| 3,238,586 | 3/1961 | Stoffel | 24/213 CS |
| 3,844,000 | 10/1974 | Hedu | 24/230 R |
| 3,900,927 | 8/1975 | D'Angelo et al. | 24/201 R |

Primary Examiner—Robert A. Hafer
Assistant Examiner—David Tarnoff
Attorney, Agent, or Firm—Warren T. Jessup; Richard D. Slehofer

[57] ABSTRACT

A locking mechanism in combination with a buckle connecting the separate straps of a horse blanket. A buckle includes a T-shaped coupling and a curved U-shaped coupling which couple together to form the buckle. The strap lock itself is comprised of a flat rectangular plate which has one end folded back onto itself to form a flange member, a base and a hollow cavity at the bight of the flange. The base contains raised projections which act as stops for preventing the loss of the strap lock. The strap lock is made of a resilient material because as it is being forced into its locking position, the bight of the flange member has to spread apart enough to slide over the curved area of the U-shaped coupling. The edge of the flange member confronts the head of the T-shaped coupling and prevents the T-coupling from sliding forward and twisting and uncoupling the buckle. The base of the strap lock lies below the slot of the T-shaped coupling and also prevents this coupling from twisting, thus preventing disengagement.

5 Claims, 7 Drawing Figures

STRAP LOCK DEVICE

BACKGROUND OF THE INVENTION

Horse blankets are well known among horsemen and horse owners. It is a rather large blanket draped over the horse's back and made of a heavy canvas material with a lining of softer material on the underside of the canvas. The blanket is of a generally rectangular shape. It has one strap sewn to one edge of the blanket and another strap sewn towards the edge of the other side. The strap sewn on the edge is much longer than the other one so that after the blanket is placed on the horse, the longer strap is drawn across the underbelly of the horse and meets the end of the other strap adjacent to the horse's flank and couples to the other coupling of the shorter strap, such that the buckle is in a vertical mode. The buckles used by horse blanket manufacturers are comprised of the standard T-shaped coupling and the curved U-shaped coupling. Most horse blankets have two sets of straps, the first set positioned behind the forelegs and the other set positioned in front of the hind legs of the animal. The longer strap contains an adjustment means for adjusting the length of either strap to make the straps and the blanket snug around the horse.

In cooler weather or when the horse is confined in a small area where it cannot move about freely to stay warm, the horse blanket is routinely used to avert discomfort to the horse or sickness of the animal. The horse blanket keeps the horse warm at night under these circumstances. The blanket protects the animal from the elements. As previously stated, the straps are tightened by the adjusting means on the longer strap. This serves quite well to prevent the uncoupling of the buckle, since both straps are firm initially. However, as the night wears on, the straps tend to loosen up for a variety of reasons and quite often the straps become so loose, and through various movements of the horse, the strap buckles become uncoupled. Once either strap buckle is uncoupled, the horse blanket hangs loosely on the horse, and as the horse moves about, and through his various bodily movements, the blanket may fall to the ground, causing damage to or soiling of the blanket from the horse stepping on it.

The problem presented was to find a way to prevent the strap buckle from uncoupling, when the blanket straps become loose around the horse. The problem was apparent and the present strap lock was invented to solve this problem.

SUMMARY OF THE INVENTION

Accordingly, it is an object of this invention to provide a locking mechanism for use with the buckle of the horse blanket for preventing the uncoupling of the buckle thus keeping the horse blanket in place for the blanket's intended purpose.

A horse blanket consists of a heavy canvas material in a generally rectangular configuration. The underside is lined with a softer material for the benefit of the horse. The blanket has two sets of straps with couplings at their ends for securing the blanket to the horse. The longer strap contains a T-shaped coupling forming half of the strap buckle. The shorter strap contains a U-shaped coupling at its end and forming the other half of the buckle. The horseman takes the longer strap and couples it to the shorter strap. When in this locked position, the two couplings are in a vertical mode. An adjustment means on the longer half of the strap is adjusted to firm up the straps around the underbelly of the horse to prevent slippage of the horse blanket.

The present invention is a flat rectangular plate having one end folded back upon itself to form a flange member and a base and creating a hollow cavity in between the two. Towards the opposite end of the flange member are two hollow circular projections which act as stops for preventing the strap lock from falling out after being inserted through the slot in the U-shaped coupling. The strap lock is fabricated from a resilient material, such as plastic, nylon 66 or metal. It has to be resilient enough to allow the bight of the flange member to spread out when forcing the strap lock into its locked position.

The curved U-shaped coupling contains a slot for looping the strap through it. There is still an open space in this slot. The end of the strap lock opposite the end having the flange member is inserted through this slot. The two raised circular projections are of a height slightly greater than the width of this slot, which would normally prevent the insertion of the strap lock if the strap lock were made of a non-resilient material. Since the lock is made of a resilient material, the hollow circular raised projections are deformed while the end of the strap lock is being forced through the slot, thus allowing the insertion of the lock past the slot. The crowns of these circular projections can be cut transversely, thus forming slits. The slits allow insertion through a slot of a much smaller width, since the projections will bend more readily. The stops thereafter return to their original height, being larger than the width of the slot, thereby preventing the strap lock from falling out of the slot and becoming lost.

The curve on the U-shaped coupling allows for the T of the T-shaped opening to be retained in a depression when the couplings are engaged. The curve of the U-shaped coupling is a hump which the flange member has to surmount in order to be correctly locked after the stops have already been inserted through the slot of the U-shaped coupling. The edge of the flange member must be forced over the curve of the U-shaped opening. In order to accomplish this, the snap lock must be of such resilient material as to allow the bight of the flange member to spread apart enough to get by this curve and thereafter return to its original configuration. The edge of the flange member confronts the T of the T-shaped coupling to offer resistance when the T of the T-shaped coupling begins to press against the edge of the flange member, which could result in the coupling becoming disengaged. The hollow cavity in between the flange member and the base provides a place for part of the slot and the curve of the U-shaped member to maintain itself such that the strap lock will be clamped over part of the U-shaped coupling and the base will lie below the slot of the T-shaped coupling.

The T-shaped coupling has to be forced away from the U-shaped coupling and twisted enough to allow for disengagement of the coupling. Since the strap lock is in a constant bias with the U-shaped coupling, and the base extends under and adjacent to the slot of the T-bar, this effectively precludes the T-bar from twisting. So the locking mechanism prevents the disengagement in two ways: one by having the edge of the flange member confront the T of the T-shaped coupling, and secondly, by having the base lie below and next to the slot of the T-shaped coupling.

DETAILED DESCRIPTION OF THE PREFERRED EMBODIMENT

Figure 7:
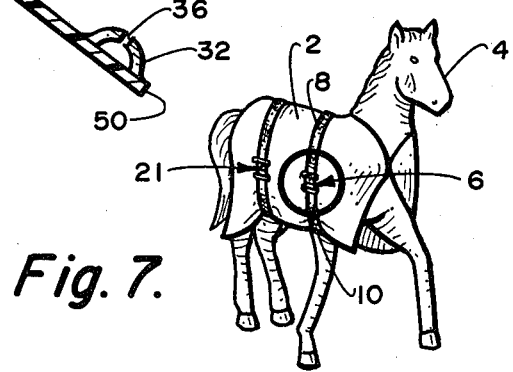
FIG. 7 illustrates a horse having the horse blanket showing the position of the straps on the horse blanket.

Referring now to the figures associated with this invention, FIG. 7 discloses a horse blanket 2 draped over the horse 4. The buckle 6 is encircled to emphasize its position. The short strap 8 is above the buckle and a longer strap 10 is the one which is attached to the other side of the blanket and spans the underbelly of the horse, coming up to the horse's flank. This is the forward set of straps which straddle the underbelly of the horse behind the horse's forelegs. The other buckle 21 and associated straps are identical to the first buckle 6, except that they are positioned towards the loins of the horse and straddle the underbelly of the horse just forward of the hind legs. It is traditional that there are two straps and this seems to be sufficient in order to keep the horse blanket in the proper position.

Figure 1:
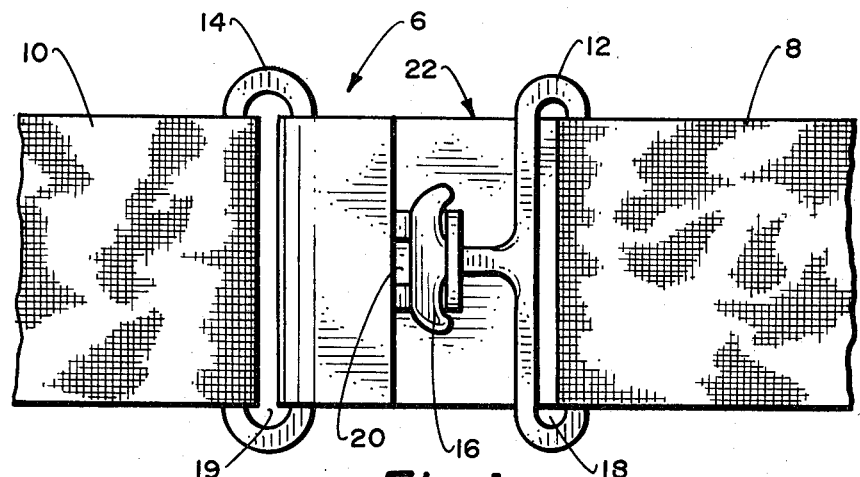
FIG. 1 is a top plan view showing the couplings engaged and the flange member of the strap lock in its locked position.

FIG. 1 discloses generally the buckle 6 with the associated straps 8 and 10 and furthermore having the strap lock 22 in its locked position.

Figure 3:
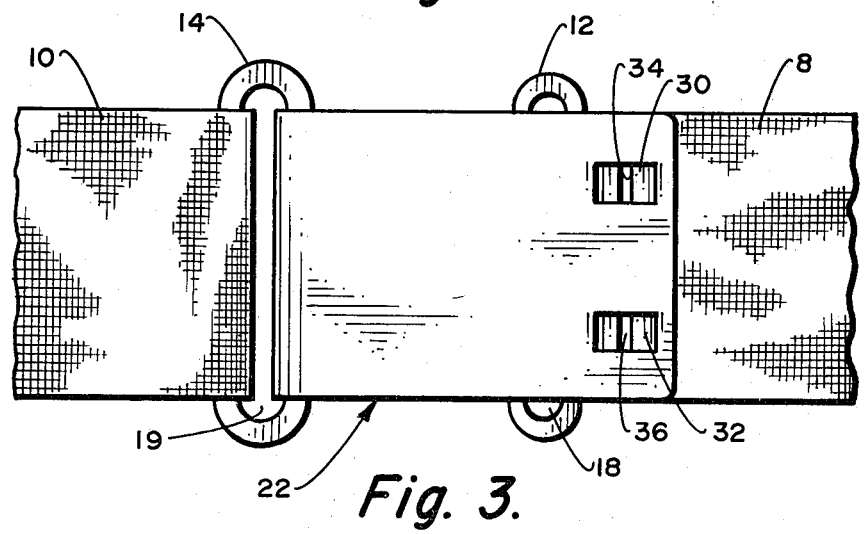
FIG. 3 is a bottom plan view showing the base of the strap lock in its locked position with the buckle.
Figure 4:
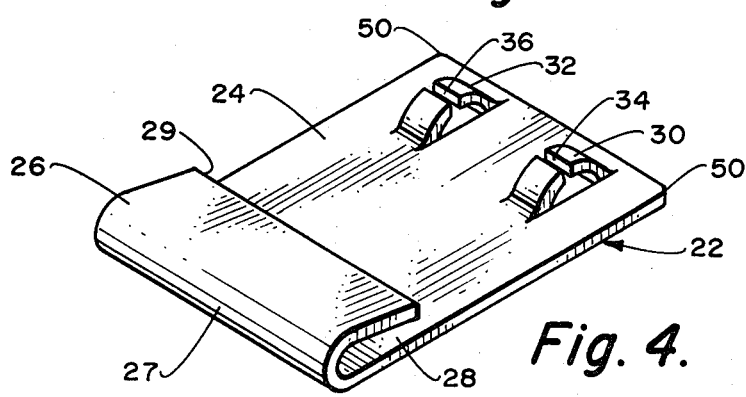
FIG. 4 is a perspective view of the strap lock without the buckle.

FIG. 4 is a perspective view of the strap lock 22. FIG. 3 shows the bottom of the strap lock in its locked position. This would be the side touching the surface of the horse when it is in position.

Referring now to perspective FIG. 4 showing the strap lock, there is defined a generally rectangular plate having one of its ends folded back upon itself, forming a flange member 26. The flange member also forms a hollow cavity 28 in between the base 24 and the flange member 26. The flange member 26 also has an edge 29 which function will be described later. There are two circular raised projections 30 and 32 which function as a stop means. Furthermore, each one has a slit 34 and 36 cut into them. One method of manufacture of the strap lock is to use a blow molding process to form the lock. The two slits 34 and 36 are cut into the raised projections 30 and 32 and after the completion of the blow molding. The material used to fabricate this strap lock has to be of a resilient nature to enable the flange member and raised projection to bend or become deformed and capable of returning to their original configuration without breaking. The material can be plastic or metal. Nylon 66 has been actually used in one embodiment and served its purpose quite well.

The buckle 6 is further comprised of two couplings. One is generally designated as a T-shaped coupling 12 and a U-shaped coupling 14. The T-shaped coupling 12 is comprised of a T-bar 16 and a bottom base having a slot 18. This slot 18 is used for looping the strap 8 therethrough. The U-shaped coupling 14 serves as the female coupling of this buckle. The curve of the U-shaped coupling 14 also includes an opening 20 for allowing the insertion of the T-bar 16, thereby coupling the buckle. The U-shaped coupling 14 also has a slot 19 for looping through the strap 10. The straps 8 and 10 are each one length of strap folded back upon itself whose ends are sewn together onto the blanket as shown in FIG. 7.

The horse blanket 2 is generally a flat rectangular piece of material having a canvas surface and a soft lining for the benefit of the horse. The blanket is draped over the horse and the long strap 10 is pulled across the underbelly of the horse and the respective ends of each strap are coupled to form the buckle. There is an adjustment means on each strap so that the straps can be tightened to create a secure fit of the blanket over the horse. This would normally be the end of the task of outfitting the horse with the blanket. This task is routine and the blanket is quite commonly used whenever the nights are cool or after the horse has had a good workout. The blanket is used to prevent the horse from cooling too rapidly, which may cause it discomfort or reduce its resistance to illness.

Quite frequently when animals are in transport, or confined in a small area, they are tied to a post to severely limit their physical movements. As a result, during the night they cannot exercise themselves and keep warm, thereby necessitating the use of a horse blanket as a prudent measure for protecting the horse against the elements.

Once the straps 8 and 10 are firmed up, the horse still normally sleeps standing up and will move about in its confined area throughout the night. During the course of the night, these straps frequently become very loose and in fact become loose enough to allow the coupling to become disengaged which results in the long strap dangling down to the floor near the horse's hooves. The horse, by stepping around, will step on the end of the long strap, while at the same time turning, thereby causing the strap to tear off the blanket or causing the blanket to fall to the floor or drape on the floor. The horse maintains his ambulatory movements and causes further tearing to the blanket or soiling of it. These blankets are quite expensive and it is preferable to keep the blanket in position. The purpose of the strap lock 22 is to keep the couplings engaged even when the strap becomes loose. When the strap is firmed up the natural tension on the straps against the couplings keeps the couplings from becoming disengaged. However, when the tension is not in the straps any longer, the slack created and the movement of the horse will cause the T-bar 16 and the U-gap 20 to become disengaged. The strap lock 22 is designed to prevent its disengagement of the coupling when the straps 8, 10 are in a slack mode.

Figure 5:
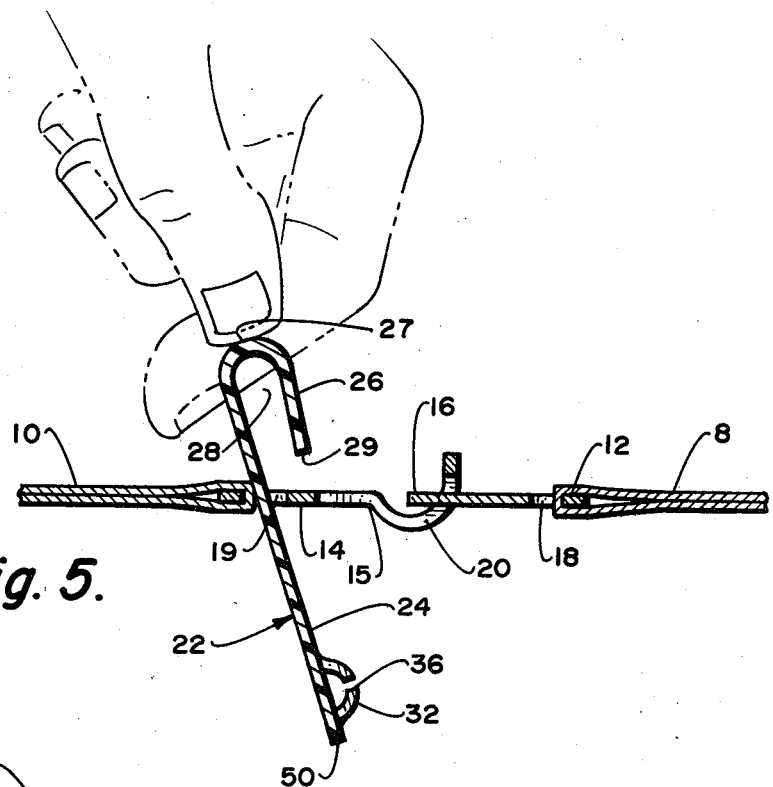
FIG. 5 is an elevational view of the strap lock after the end having the stop means is inserted through the slot of the U-shaped coupling.

Referring now to FIG. 5, raised projections 30 and 32 are of a slightly greater height than the width of the slot 19 of the U-shaped coupling 14. The slot 19 does have the strap 10 looped through it, but there still is a certain amount of space remaining. The strap lock is initially connected to the buckle by pressing or forcing the edge 50 of the strap lock 22 opposite the end having the flange member 26. There must be sufficient force exerted on the bight 27 of the strap lock to cause the projections 30 and 32 to become deformed and resulting in a lower height, allowing passage through the slot 19. The compressibility of the material used to make this strap lock allows for this resiliency. After passage of the stop means 32, 30, the strap lock cannot be pulled out of the slot 19 unless there is sufficient outside force pulling on it. This is a convenience to the horse owner in that the snap lock 22 will always be ready and available when needed, rather than having to search around and insert it every time it is to be used. However, it is within the scope of this invention that the stop means 30 and 32, or whatever means would be used for preventing the loss of the lock 22, could be eliminated. The stop means as disclosed in FIG. 4 further has slits 34, 36 cut into the top. This allows for easier deformation of these raised projections 30, 32 whenever one encounters a slot 19 which is of a smaller width than normally expected. The U-shaped 14 and T-shaped 12 couplings are the standard variety of buckles used. However, the quality control is variable upon the width of the slot 19, since this is not a critical part of the buckle. The slits 34, 36 are convenient in allowing for the variations of slots 19 actually found on the market.

The buckles 6 and 20 are common kinds of buckles used by horse blanket manufacturers and the strap lock 22 would find a ready market available.

Figure 2:
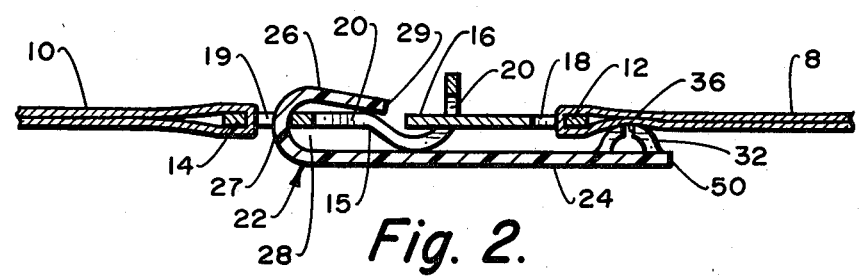
FIG. 2 is a side sectional view taken along the line 2—2 of FIG. 1, showing the strap lock in its fully locked position and the flange member in its unstretched configuration.
Figure 6:
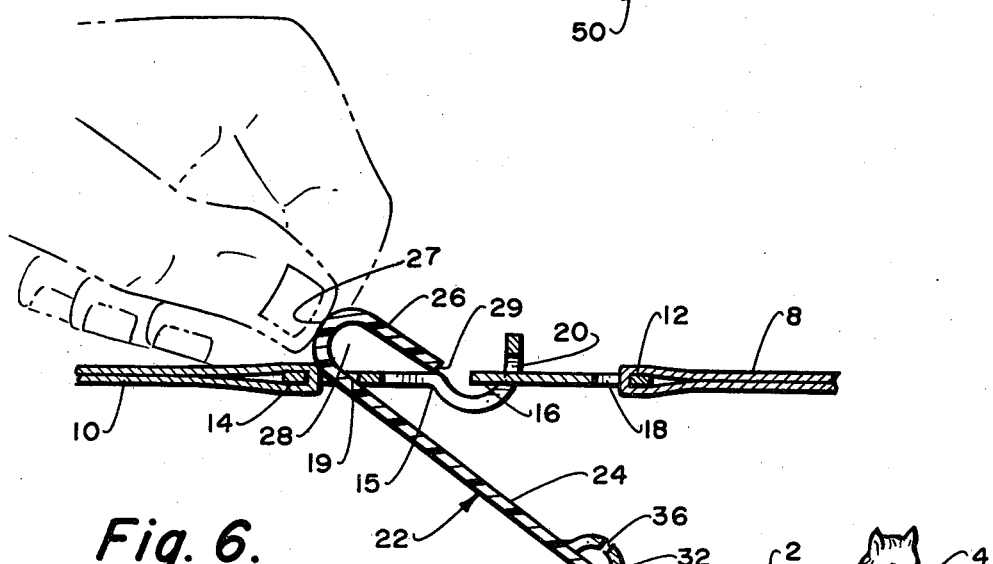
FIG. 6 is the next sequence after FIG. 5 when the flange member is being forced over the hump of the curve of the U-shaped coupling, causing the bight of the flange member to spread out slightly.

Referring again to FIG. 5, where the stop means 32 have been inserted through the slot 19. The next step is to force the flange member 26 into position. FIG. 6 shows the edge 29 of the flange member 26 touching the hump 15 of the U-shaped coupling 14. The dimensions are such that the bight 27 of the flange member 26 will have to spread apart in order to allow the edge 29 to go past the hump 15. This is accomplished by pressure from the thumb of the horseman and after it overcomes the hump 15 the strap lock can be placed in its locked position as disclosed in FIG. 2. The flange member 26 returns to its normal prestretched condition again because of the materials used in forming the strap lock 22, which give it resiliency without fear of having the bight 27 and the flange member 26 break or become permanently deformed when the flange member 26 returns to its original position. There is a further locking factor because there will have to be sufficient force pressed against the edge 29 of the flange member 26 in order to push it back out of its locked position. When in its locked position, as disclosed in FIG. 2, the edge 29 of the flange member 26 confronts the T-bar 16. The T-bar enters in a perpendicular manner through the gap 20 of the U-shaped coupling 14. Then it is twisted 90° to put it in its normal coupling position as disclosed in FIGS. 1 and 2.

In order for the T-bar 16 to become uncoupled, it has to be pressed closer to the U-shaped coupling 14 and rotated again. The strap lock 22 effectively stops this forward motion under the confrontation of the edge 29 against the T-bar head 16. The T-bar can go over or under the edge slightly in actual practice. However, it still has to be twisted or turned at 90° in order to disengage the T-bar 16 from the gap 20. The base 24 of the strap lock effectively prevents any twisting of the base of the T-shaped coupling 12. Since the base cannot be twisted, it effectively prevents the T-bar 16 from being twisted to the required 90° and becoming disengaged. This locking mechanism will remain in place, even if the straps become slack through the horse's movements throughout the night.

The horse blanket 2 may shift position slightly, but at least it will not come off the horse during the night, thus effectively insuring the safety of the horse blanket. To unlock the strap lock, a simple reversal of the locking process is used. A grip of the corners of the edge 50 of the lock 22 by the index finger and thumb and a pull downward forces the flange member 26 back over the hump 15 of the U-shaped coupling 14, or pressure can be placed at the edge 29 of the flange member 26 and thumb pressure can be exerted there. The flange member will snap off or slide over the hump 15 of the U-shaped coupling 14, and it can be pulled out of the slot 19 until the stop means 30, 32 prevents it from coming farther out. This allows the 90° turning of the T-bar 16 compared to the gap 20 to disengage the buckle and thereafter removing the horse blanket 2 from the horse.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A strap lock for a strap buckle, said buckle having a T-shaped coupling and a curved U-shaped coupling, each having a slot for connection to separate straps attached to a horse blanket, said strap lock being insertable into one of said buckle slots for preventing uncoupling of the buckle when the blanket is in place on an animal and the T-shaped coupling and U-shaped coupling are engaged, said strap lock comprising:
    a flat rectangular plate having one end folded back upon itself and forming a flange, a base, and a bight between said flange and said base;
    when said strap lock is in a locked position said base is lying below the slot of the T-shaped coupling for preventing it from twisting, said bight is holding the engaged U-shaped and T-shaped couplings and prevents the engaged couplings from twisting and becoming uncoupled;
    stop means on said base for inhibiting the disengagement of said base through the slot of the U-shaped coupling;

2. The device as recited in claim 1 wherein said strap lock is comprised of a resilient material such as plastic nylon for allowing said bight of said flange to spread apart while said base is inserted through said slot of said U-shaped coupling.

3. The device as recited in claim 1 wherein said stop means comprises at least one raised projection having a height slightly greater than the width of said slot of said U-shaped coupling, said height being close enough in dimension to said width of said slot for allowing forced insertion of said stop means through said slot and inhibiting detachment of said lock other than by force.

4. The device as recited in claim 1 wherein flange has an edge which confronts the head of said T-shaped coupling and said base lies below said slot of said T-shaped coupling, when said T-shaped coupling and said U-shaped coupling are engaged and when said strap lock is engaged, thereby preventing the disengagement of said T-shaped coupling from said U-shaped coupling.

5. The device as recited in claim 3 further comprising a slit in said raised projection for allowing forced insertion of said stop means through said U-shaped slot having a width much less than the height of said raised projection and inhibiting detachment of said lock other than by force.

* * * * *